United States Patent [19]
Forchheimer et al.

[11] Patent Number: 5,982,393
[45] Date of Patent: Nov. 9, 1999

[54] ARRANGEMENT AT AN IMAGE PROCESSOR

[75] Inventors: Robert Forchheimer; Anders Åström, both of Linköping, Sweden

[73] Assignee: IVP Integrated Vision Products AB, Linkoping, Sweden

[21] Appl. No.: 08/776,070

[22] PCT Filed: Jul. 18, 1995

[86] PCT No.: PCT/SE95/00868

§ 371 Date: Feb. 14, 1997

§ 102(e) Date: Feb. 14, 1997

[87] PCT Pub. No.: WO96/03700

PCT Pub. Date: Feb. 8, 1996

[30]  Foreign Application Priority Data

Jul. 22, 1994 [SE] Sweden .................................. 9402551

[51] Int. Cl.$^6$ ..................................................... G06F 15/16
[52] U.S. Cl. ........................................... 345/505; 345/524
[58] Field of Search ............................. 345/68, 502, 505, 345/524, 525, 526, 519

[56]  References Cited

U.S. PATENT DOCUMENTS

| | | |
|---|---|---|
| 5,434,968 | 7/1995 | Kunii ....................................... 395/163 |
| 5,473,750 | 12/1995 | Hattori .................................... 395/163 |
| 5,557,734 | 9/1996 | Wilson ..................................... 395/162 |
| 5,649,106 | 7/1997 | Tsujimichi ......................... 395/200.08 |

FOREIGN PATENT DOCUMENTS

| | | |
|---|---|---|
| 0422964 | 4/1991 | European Pat. Off. . |
| 431 145 | 1/1983 | Sweden . |
| 466 074 | 12/1991 | Sweden . |
| 8807722 | 6/1988 | WIPO . |

*Primary Examiner*—Eric Coleman
*Attorney, Agent, or Firm*—Merchant, Gould, Smith, Edell, Welter & Schmidt, P.A.

[57]  ABSTRACT

The present invention relates to a parallel processor containing a number of processor elements of the same type which are integrated on one and the same semiconductor chip. The processor is of the type that allows image and signal processing of the information stored in the processor element. The device contains a unit block (3) for each processor element and is characterized in that each unit block comprises at least two incrementing units (1a, 1b) which are designed to add a signal supplied to the unit block and a signal which originates from an incrementing unit corresponding to the respective unit in the closest preceding unit block in every direction of the processor element matrix. Every unit block (3) further contains at least one logical unit (2) which is designed to perform Boolean logic operations on the signals received from the incrementing units of the unit block.

6 Claims, 3 Drawing Sheets

ARRANGEMENT AT AN IMAGE PROCESSOR

FIELD OF THE INVENTION

The present invention relates to a device in a parallel processor containing a number of processor elements of the same type which are integrated on one and the same semiconductor chip, and which are of the kind that allows parallel image or signal processing of the information stored in the processor element, whereby the said device contains a unit block for each processor element.

BACKGROUND OF THE INVENTION

In data-type image processing, high demands are made on a very fast performance of the image-associated operations. A way of achieving a high processing speed is to use units with an integrated unit solution comprising both a camera in the form of a photodiode matrix and an image processor. Such an arrangement is known from, e.g., SE, B, 431 145 which presents an image processor which contains a device able to indicate the image dots belonging to a connected object, and produces a binary signal corresponding to the object when the relevant image dot, on the one hand, meets a condition specific to the object, and, on the other hand, is indicated as entering the object, or when the closest adjacent image dots are distinguished. By means of this known technique the need is reduced for a serial output of image data, and a substantially reduced amount of information is obtained which, with less time consumption than for the known image processing systems, can be output for further image processing.

Another example of corresponding parallel signal processing is described in Swedish Patent No. 9001556-1. The intention here is to be able to carry out computations on radar signals in addition to image processing.

A drawback with the known technique is that the known processors cannot perform so-called arithmetic global operations with the same efficiency, for example determine the centre of median for every object in a read-in vector. In the known device, there takes place with this type of operation a serial outputting of image data which, in per se time terms, reduces the advantages of the fast image processors.

SUMMARY OF THE INVENTION

The object of the present invention is to obviate this drawback and to provide a processor wherein each processor element is connected with a unit block which makes arithmetic global operations possible. This object is achieved in that each unit block comprises at least two incrementing units which are designed to add a signal supplied to the unit block, and a signal which originates from an incrementing unit corresponding to the respective unit in the closest preceding unit block in every direction of the processor element matrix, and in that every unit block further contains at least one logical unit which is designed to perform logical operations of Boolean type on the signals received from the incrementing units of the unit block.

According to a characteristic of the invention, said signal supplied to the unit block corresponds to an image or radar signal coming from a processor element.

According to a particular characteristic of the invention, the number of incrementing units in every unit block is two, and the device is preferably designed to be used in line image processing and signal processing.

According to a further particular characteristic of the invention, said incrementing units each contain a plurality of half adders, an AND-gate is connected to one input on the respective half adders, and one input of the AND-gate is connected to the output of the corresponding half adder in the preceding incrementing unit.

According to a further special characteristic of the invention, every incrementing unit contains precisely one half adder over the logarithm of base two of the number of processor elements arranged in line.

According to a last particular characteristic of the invention, said logical unit is designed to compare the values of the incrementing units in every unit block.

BRIEF DESCRIPTION OF THE DRAWINGS

The invention will be explained in greater detail in the following, with reference to the attached drawings wherein.

DETAILED DESCRIPTION OF THE PREFERRED EMBODIMENT(S)

The device of the invention is preferably designed for line image processing, and the description which follows is based on this preferred form of embodiment.

A processor of the invention comprises logical units which can perform arithmetic operations (AGLU= Arithmetic Global Logical Unit). Each processor element (PE) is connected with a unit block 3 corresponding to the element, which contains two incrementing units 1$a$, 1$b$ with a preferred embodiment according to FIG. 3. Said incrementing unit makes it possible to increase the value originating from the adjacent unit block. In the preferred embodiment, there takes place an increase of value from the adjacent unit block if the parameter $D_i$ is made to assume the value $D_i=1$. When the parameter $D_i$ is made to assume the value $D_i=0$, the value from the adjacent unit block is retained. The spread between the different unit blocks can be blocked further if $P_i$ is made to assume the value $P_i=0$. The function that is carried out in every unit block may be described by the equation.

$$X_i = P_i X_{i-1} + D_i \tag{1}$$

Figure 1:
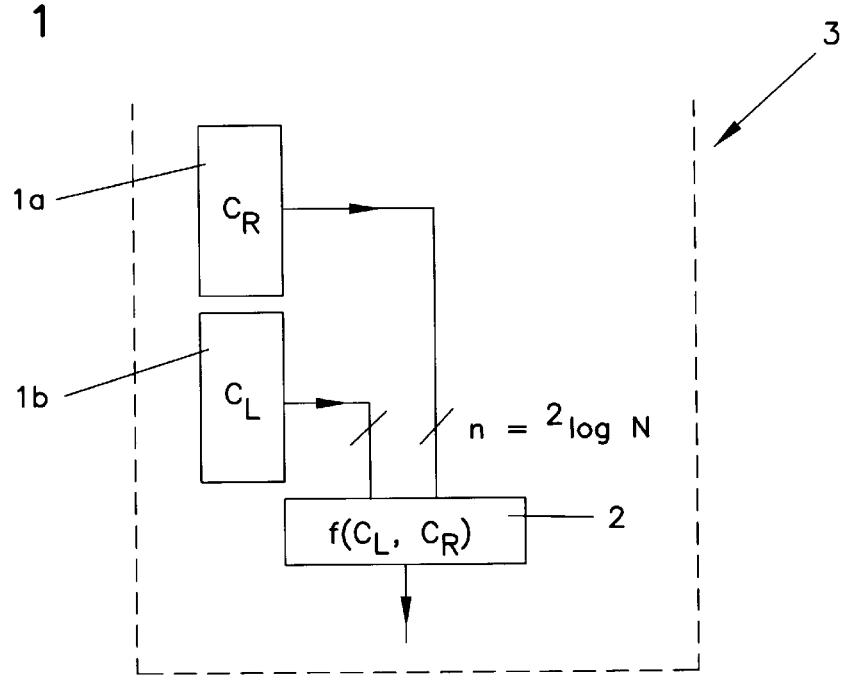
FIG. 1 shows a unit block of the invention.
Figure 2:
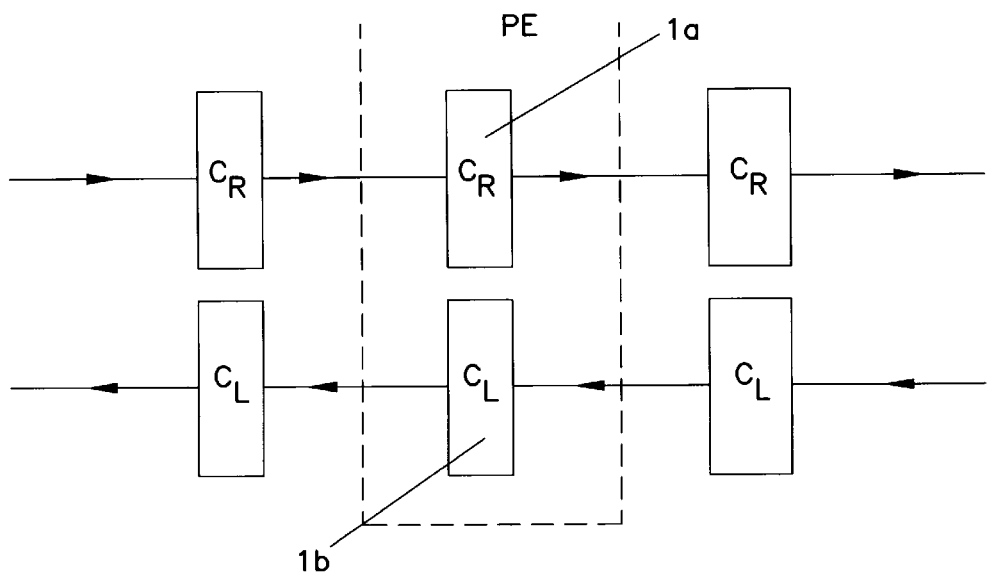
FIG. 2 shows how the incrementing units in differing unit blocks.
Figure 3:
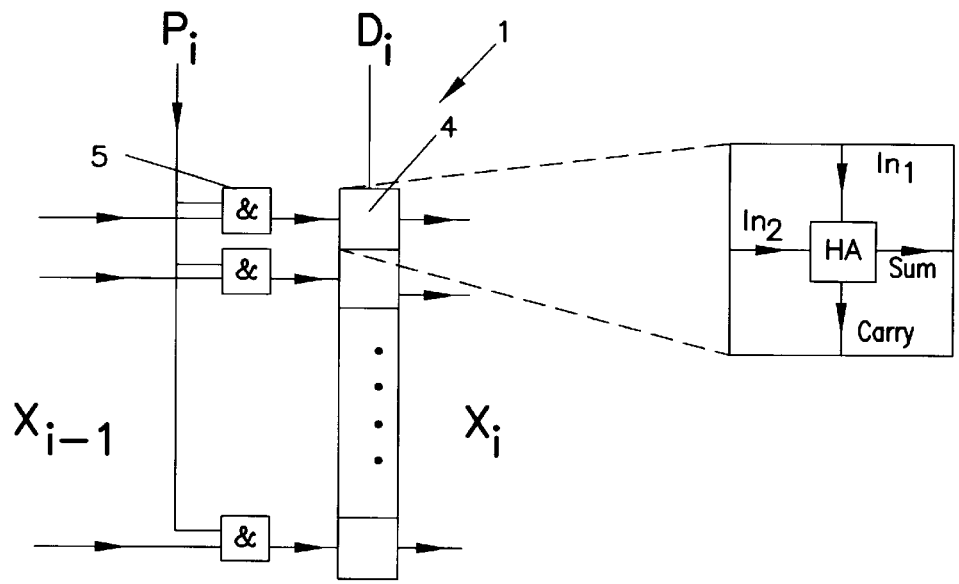
FIG. 3 shows a preferred implementation of an incrementing unit.

To be able to perform the arithmetic global operations, each unit block contains two incrementing units; one for each direction in the matrix of the processor element, as may be seen in FIG. 3. Apart from the spread direction of the units, these two incrementing units are identical.

Figure 4:
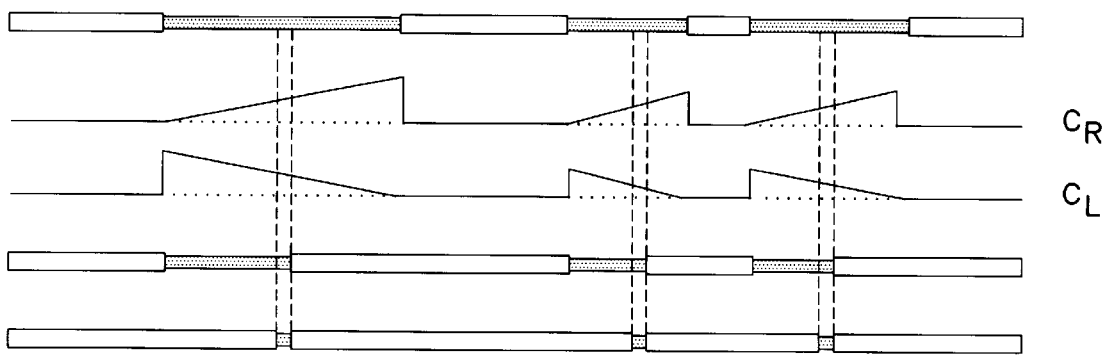
FIGS. 4–7 show examples of different arithmetic global operations that can be carried out with a device of the invention.

FIG. 4 shows a block diagram of a complete unit block of the invention. The two incrementing units 1$a$, 1$b$ are connected with a logical unit 2 which can perform Boolean logic operations on the signals received from the incrementing units of the unit block. The logical unit is furthermore connected with an accumulator register in the image processor.

In a preferred embodiment of the invention a logical operation of the type $$f(CL, CR) = \begin{cases} 1 & CL \geq CR \\ 0 & \text{otherwise} \end{cases}$$

is carried out in said logical unit.

In the above mentioned function it is possible to determine a mean value for a plurality of objects in an image vector. This is effected in that local ramps are formed for each object by means of the incrementing units, cf. FIG. 4. The value in the image dot corresponding to the unit block may represent the in-signal $P_j$, and the respective incrementing unit and parameter $D_i$ may assume the value $D_i=1$. When the logical unit carries out the above-mentioned comparison, all the image dots in the object come to the left if the mean value to be assigned is the value one, as a result of which a signal vector containing a number of consecutive ones is created. The mean value can be thereafter easily determined through establishing the right-hand side for the consecutive ones.

The centre point in the area between two objects may be determined in a manner which resembles the one given above, with the exception that the image vector is inverted while the ramp formation takes place in the incrementing units.

Figure 5:
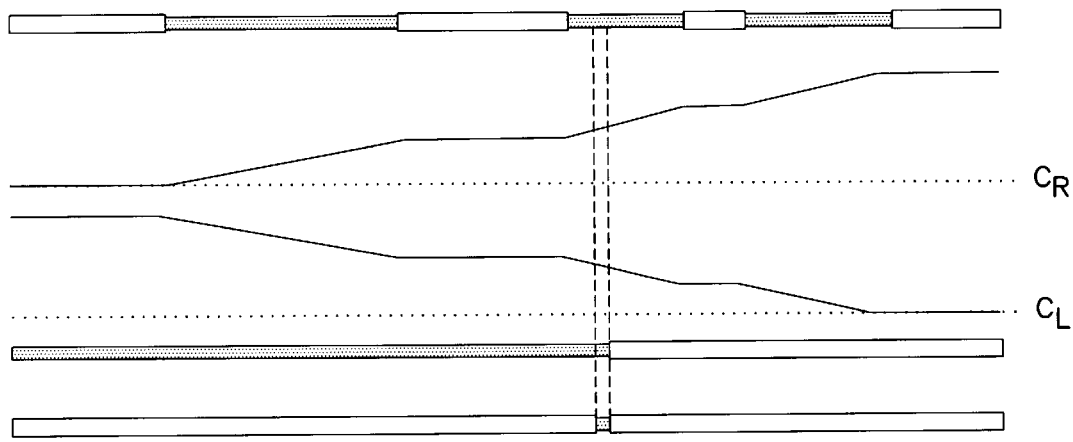

When the mean of the image vector is to be determined, the incrementing units are to perform a summation function at which the value of the image dot corresponding to a unit block is added to the accumulated value for all preceding image dots, as shown in FIG. 5. This summation function is carried out when there is allotted to $P_i$ the value $P_i=1$ and $D_i$ is arrived at from the value of the image dots corresponding to the unit block.

Figure 6:
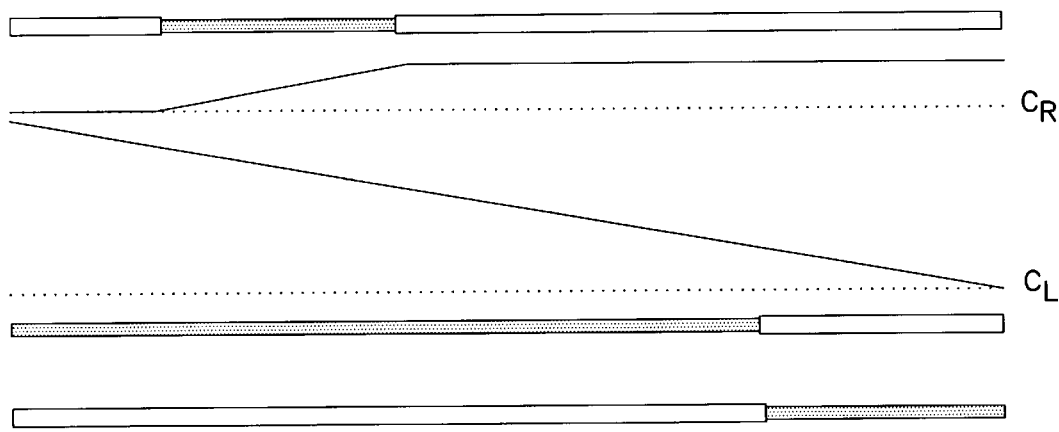

A global shift implies that the whole object is shifted to the right side of the vector. To perform this type of shift, the incrementing units in the respective unit block must perform various types of summation operations, as may be seen in FIG. 6. In the incrementing unit which is summated to the right, the value of an image dot corresponding to a unit block is added to the accumulated value for the preceding image points in the same manner as for the determination of the image vector mean. In the incrementing unit summing to the left a ramp formation takes place in that $P_i$ and $D_1$ must both assume the value 1. In the comparing logical unit there is formed a vector having a number of consecutive ones and the result is determined in the same way as before in that the right side for the consecutive ones is established.

In another form of embodiment of the invention the logical circuit is made, instead, to perform the function:

$$f(CL, CR) = \begin{cases} 1 & CL > 0 \text{ or } CR > 0 \\ 0 & \text{other} \end{cases}$$

Figure 7:
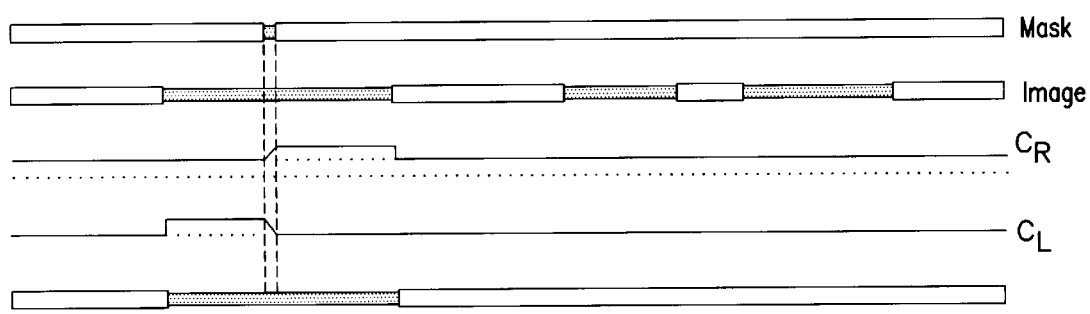

With this function it will be possible to perform an object detection of the previously known type, wherein the whole object in the image signal is selected in accordance with FIG. 7. In this type of operation the in-signal $P_i$ for each unit block is constituted by the value for the image dot corresponding to the unit block in the image vector, and the in-signal D is constituted by the selecting vector.

We claim:

1. A device in a parallel processor containing a number of processor elements of the same type which are integrated on one and the same semiconductor chip, and which are of the kind that allows parallel image or signal processing of the information stored in the processor element, whereby the said device contains a unit block (3) for each processor element, characterised in that each unit block (3) comprises at least two incrementing units (1a, 1b) which are designed to add a signal supplied to the unit block and a signal which originates from an incrementing unit corresponding to the respective unit in the closest preceding unit block in every direction of the processor element matrix, and in that every unit block (3) further contains at least one logical unit (2) which is designed to perform logical operations of Boolean type on the signals received from the incrementing units of the unit block.

2. A device according to claim 1, characterised in that said signal supplied to the unit block corresponds to an image or radar signal coming from a processor element.

3. A device according to claim 1, characterised in that the number of incrementing units in every unit block is two, and the device is preferably designed to be used in line image processing and signal processing.

4. A device according to claim 1, characterised in that said incrementing units each contain a plurality of half adders (4), in that an AND-gate (5) is connected to one input on the respective half adders, and one input of the AND-gate is connected to the output of the respective half adder in the preceding incrementing unit.

5. A device according to claim 4, characterised in that every incrementing unit (1) contains precisely one half adder (4) over the logarithm to base two of the number of processor elements arranged in line.

6. A device according to claim 1, characterised in that said logical unit (2) is designed to compare the values of the incrementing units (1a, 1b) in every unit block (3).

* * * * *